INVENTOR.
BY GEORGE J. TOPOL
Albert L. Jeffers
attorney

Aug. 17, 1965

G. J. TOPOL 3,200,700

PHOTOELECTRIC COMPARISON APPARATUS FOR INDICATING
THE AMOUNT OF CONTAMINATION IN LIQUIDS

Filed April 23, 1959

INVENTOR.

BY GEORGE J. TOPOL

Albert L. Jeffers
attorney

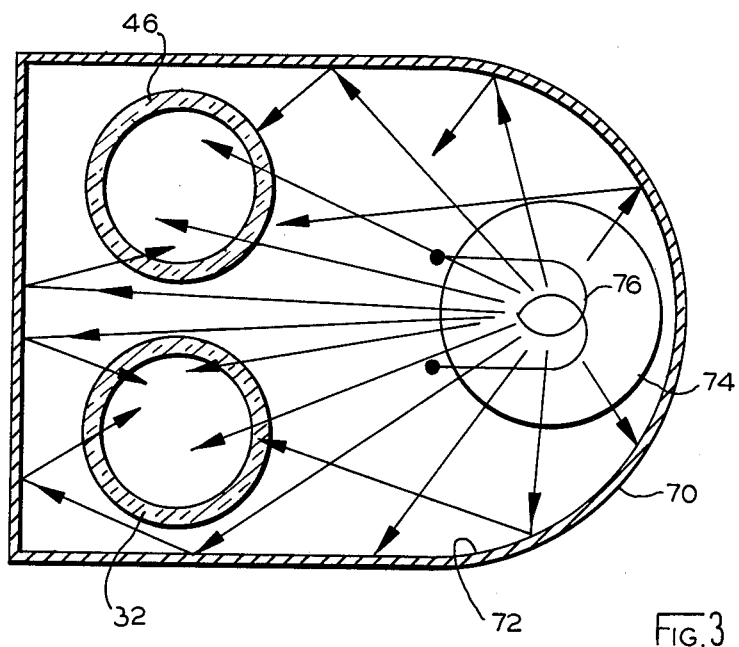
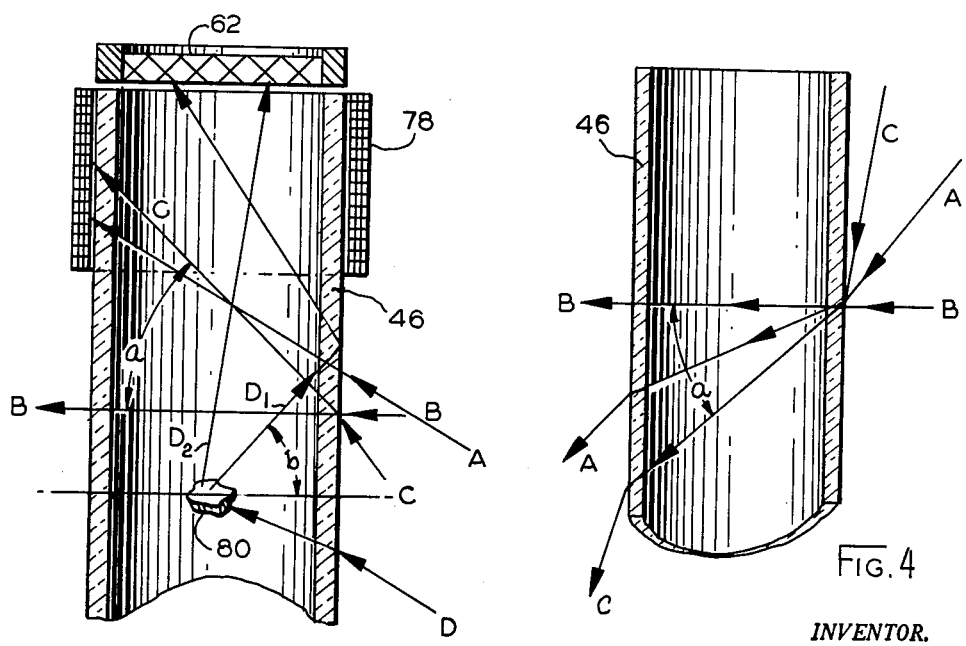

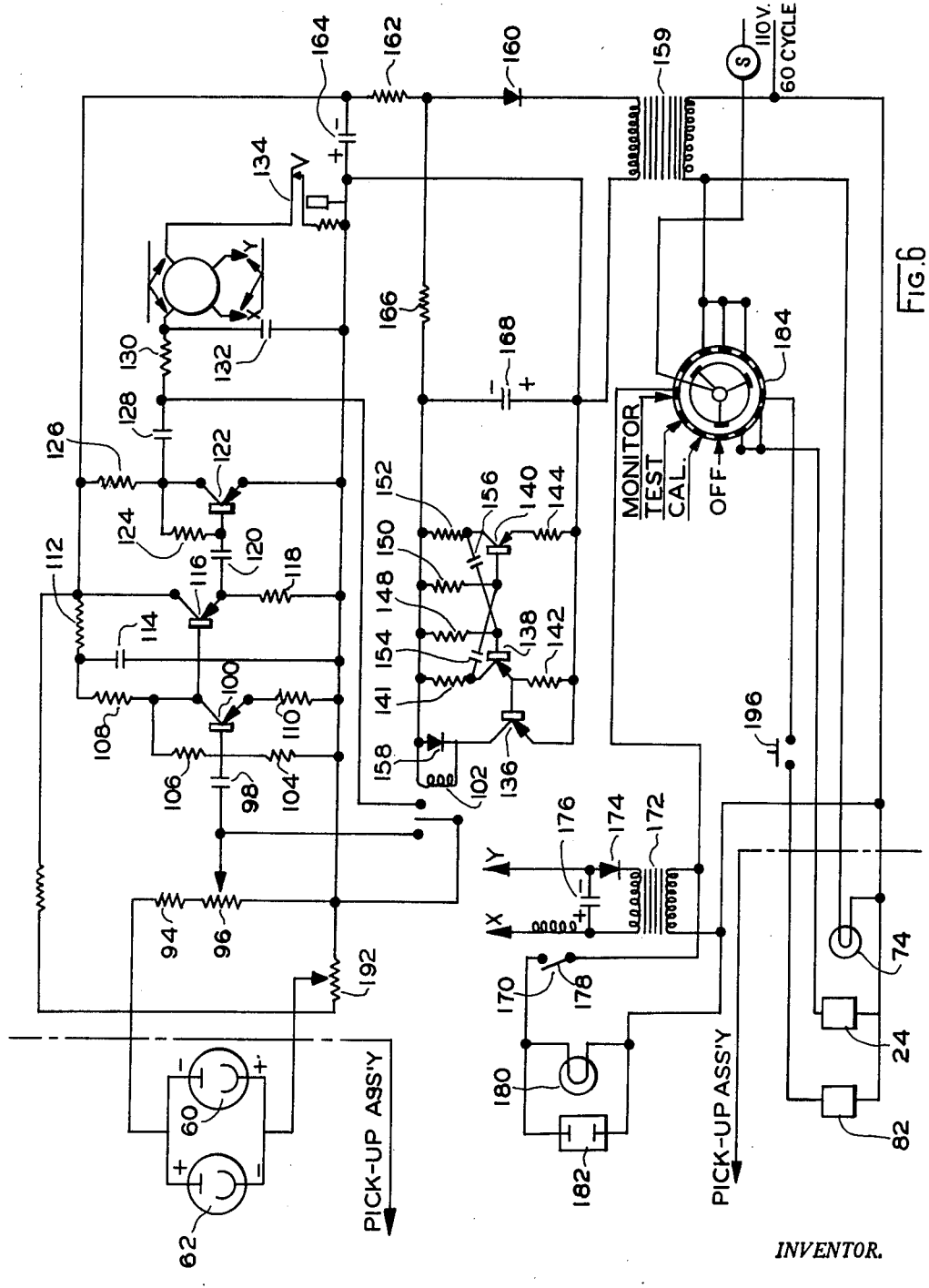

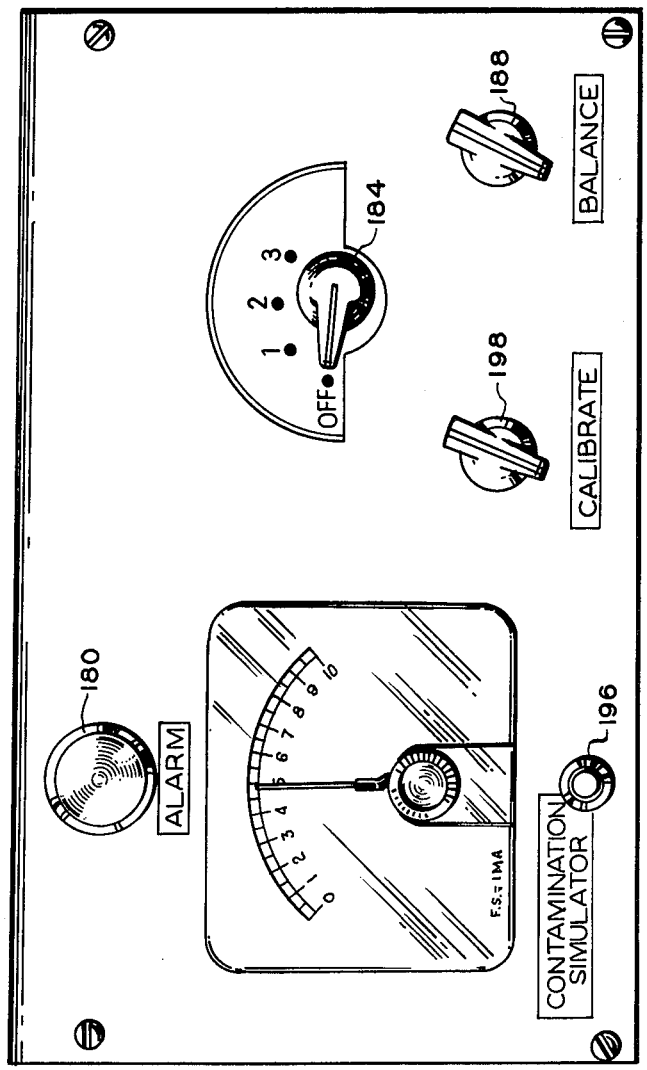

United States Patent Office 3,200,700
Patented Aug. 17, 1965

3,200,700
PHOTOELECTRIC COMPARISON APPARATUS FOR INDICATING THE AMOUNT OF CONTAMINATION IN LIQUIDS
George J. Topol, Hamilton, Ontario, Canada, assignor to Bowser, Inc., Cookeville, Tenn., a corporation of Indiana
Filed Apr. 23, 1959, Ser. No. 808,406
4 Claims. (Cl. 88—14)

This invention relates to an instrument and process for testing contamination in transparent fluids to provide a quantitative analysis of such contamination.

It is of extreme importance that liquids such as fuels which are intended for use in turbine engines be as free of contamination as possible in order to safeguard the working parts of the engine. Contaminants vary considerably in their origin, size and composition but they are all generally objectionable because of their abrasive effect which can detract from performance of the engine and unduly shorten the useful life of the engine.

The present invention is based upon the phenomena by which suspended contaminant particles scatter light when exposed to illumination. A quantitative measure of the amount of contamination can be established by relating the degree of light scattering to the amount of contamination by means of a suitable measuring device, the principle being that there is a direct correlation between the degree of light scattering and the degree of contamination. While it is true that this correlation takes no cognizance of the kind of contaminant and is in effect a "statistical" approach to the problem, it is a reliable correlation, since the number of particles over the full range of the sizes affects the value of the instrument reading as well as the individual particle sizes and these criteria must both be given weight to predict the deleterious effect on the engine.

Heretofore, testing for contamination in fuels has generally been by visual inspection aided by microscopic analysis. This method is unsatisfactory since the microscopic analysis is slow and therefore fails to provide an immediacy which is essential to fuel handling. For example, if the fuel should be determined to be contaminated, this calls for prompt action, e.g. stopping fueling operation. Unlike these prior methods, the light scattering method is substantially instantaneous and can operate continuously to provide an accurate uninterrupted assay of the fuel purity.

A further distinct advantage over prior methods of measuring contamination lies in the sensitivity and repeatability of the measurements provided by this invention.

One of the objects of the present invention is to provide a test device utilizing light scattering wherein color and other inherent properties of the liquid under test which affect light scattering are eliminated as possible obscuring factors in obtaining a precise measurement of liquid contamination.

A further object of the invention is to provide a testing device which may be readily balanced and calibrated to provide it with versatile range which may vary from a high degree of sensitivity to whatever less degree is desired.

A further feature of the invention is the reliability of the instrument, this being made possible by ready means for checking the operation of the instrument. Thus, the possibility of "faults" creeping into the contamination reading, is minimized whether the malfunctioning arises from faulty components or improper operating procedure.

Another important feature of the present invention is that the sampling part of the instrument may be located remotely from the control and intelligence section of the instrument so that it is possible to test the liquid at various points and from a remote location. This adds to the safety and efficiency of the present process.

A feature of the light scattering instrument is that of excluding substantially all illumination from a photometric means except that originating as scattered light from suspended contaminants, and, in this manner, energization of the photometric means is directly related to the amount of scattered light which in turn is a measurement of the degree of contamination.

The present invention is adaptable for both continuous and intermittent operation and may be further adapted to provide a continuous written record of the purity of the liquid being tested. It is also a part of the invention to include warning provision in the form of audible or visual signals or both to make known any degree of contamination in excess of any predetermined amount.

Other objects and features of the present invention will become apparent from a consideration of the following description which proceeds with reference to the accompanying drawings wherein:

FIGURE 3 is a horizontal section view taken through the center of the housing which contains the light source and tubes shown in FIGURES 1 and 2;

FIGURE 4 is a schematic diagram showing various refractive angles for different light beams entering the tube;

FIGURE 5 illustrates the method whereby all light is excluded from the photometric means other than scattered light from contaminants;

FIGURE 6 is a circuit diagram showing how the signals derived from the photometric cells are connected in opposition and how the resulting signal is then amplified and transmitted to metering coil, recorder jack and other suitable instruments. The control instruments for operating the instrument, and calibrating are also shown; and, FIGURE 7 shows the instrument panel of the control box which is used for operating the instrument and noting the testing results.

Although the following description will be with reference to testing transparent liquids such as fuels for solid contaminants as suspended particle material, it will be appreciated that liquids other than fuels can be tested and for contaminants other than solid contaminants. For example, water can be tested for in oils and the like to mention another example of how the invention may be applied.

Figure 1:
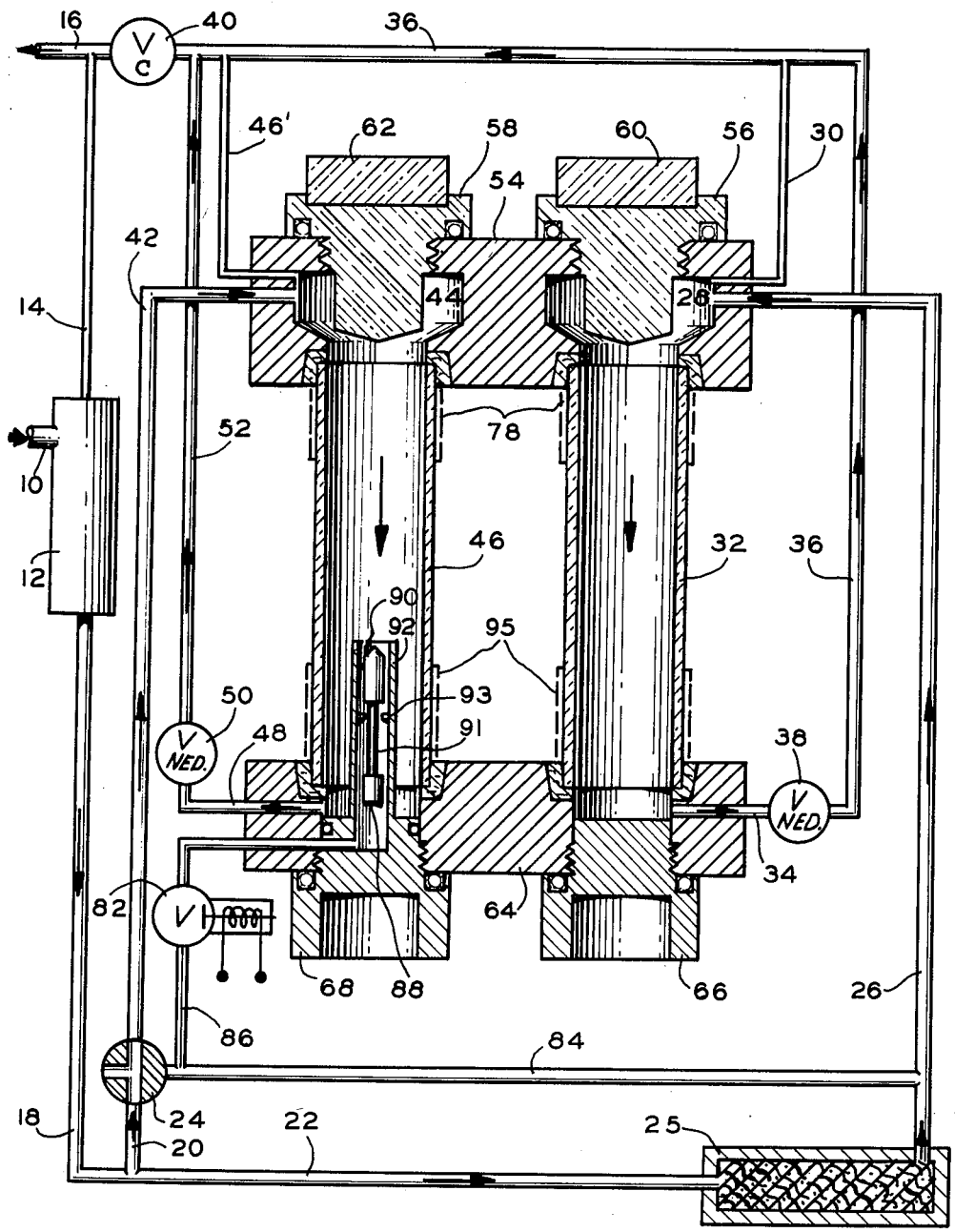
FIGURE 1 is a schematic view of the test device and fluid lines showing fluid flow under testing conditions.

Assuming that the liquid under test is a fuel, then at the point where the fuel is being dispensed, there is a suitable intake line 10 which diverts a continuous sample flow of the liquid fuel through an air eliminator 12 which separates entrained air and returns it through line 14 to a return line 16. The fuel sampling, after leaving the air eliminator through line 18, is separated into two branch flow lines 20 and 22 (FIGURE 1) between which the fuel is substantially equally divided. This division of flow is accomplished when the three-way valve 24 is positioned as shown in FIGURE 1. The fuel in line 22 is passed through a filter 25 which removes all of the contaminants rendering the outgoing fuel in line 26 substantially contamination free. The line 26 channels the fluid to a chamber 28 where it is de-aerated through line 30, the flow of fluid being downwardly in a tubular member 32 having transparent walls. The fluid then leaves the tubular member 32 and enters a passage 34 which connects with return line 36 through a needle valve 38, the return line 36 connecting with return line 16 through a constant flow value 40 which ensures a constant flow of fluid regardless of changes in the pressure in the inlet sampling line 10. The fluid in branch 20 passes through the three-way valve 24 (FIGURE 1) into line 42 which channels the fluid into a chamber 44 where the fluid is de-aerated through line 46′ connecting with return line 36.

The unfiltered fuel in chamber 44 flows downwardly as indicated by the arrow into a tubular member 46 having transparent walls and of generally the same construction as the tubular member 32. The fluid in the tubular member 46 exits through a passage 48 and needle valve 50 into a return line 52 which is interconnected with return line 36 and also passes through the constant flow control valve 40 to be returned via return line 16. Each tubular member 32 and 46 is fluid tightly positioned at its upper ends within an adapter 54 having transparent plastic plugs 56, 58 threadedly received in the adapter and including photometric cells 60 and 62 positioned therein.

The bottom ends of the tubular members 32 and 46 are likewise fluid tightly received in an adapter 64 having plugs 66 and 68 threaded within the adapter 64. The general course of fluid flow and setting of the valves shown in FIGURE 1 is that provided when the instrument is in testing condition.

Referring now to FIGURE 3, which is a section view taken perpendicularly through the tubular members 32 and 46, a housing 70 completely enshrouds the tubular members 32 and 46 so as to shut out all exterior light. The inner surfaces 72 of the housing are highly reflective by polishing or covering with a white colored coating. A light source 74 having a filament 76 which is electrically illuminated generates a series of light beams some being schematically indicated by the arrows. Some of the light beams, it will be seen, are reflected from the inner surface 72 of the housing 70 so that they strike the surface of the tubular members 32 and 46 at numerous different angles. Since the walls of the tubular members are transparent and are of a denser medium than the air the light rays will be refracted (FIGURE 4) in the direction of the horizontal. Thus, light beam "C" is refracted to more nearly approach the horizontal line of light beam "B" which is unaffected and light beam "A" is refracted also to approach the horizontal direction. Only those light beams passing perpendicularly through the tubular member such as beam "B" will be unbent. The result of this phenomena is utilized in the present invention as will be explained in connection with FIGURE 5.

All of the light beams originating from outside the tubular member 46 will pass through the tubular member 46 and the liquid contents. However, for those light rays which approach a critical angle (which is about 37°), there is a possibility of reflection within the tubular member 46. For example, referring to light beam "C" (FIGURE 5), such beam can be reflected within the tubular member at the outer tubular wall and would, if unimpeded, impinge against the photo cell 62. To prevent such occurrence, the outer wall of the tubular member 46 is blackened as indicated by reference numeral 78 where it is absorbed on the black surface.

For those light beams, as for example "D," which are scattered by reflection from contamination particles indicated schematically by reference numeral 80, there is reflection at conceivable angles D1 and D2, the beam D2 impinging directly against the photometric cell 62, the beam D1 being at angle B, which is in excess of the critical angle, will be totally reflected and will travel freely within the medium of the fluid and tubular member so that it will impinge on the photometric cell 62.

It is an inherent phenomena of light traveling within a medium at an angle greater than the critical angle, that such beams will reflect fully within the medium. The net effect of the described phenomena is that all illumination from the light source to the photometric cell is eliminated except for such light that is scattered by contaminant particles. The scattered light in its intensity, which is measured by energization of the photometric cell, is then correlated with the degree of contamination in the liquid.

The two photometric cells 60 and 62 measure the amount of scattered light in the tubular member containing filtered and unfiltered fluid respectively and are connected in opposition so that such light scatter as is naturally scattered owing to color, haze, etc. is eliminated from the test results and the signal derived from opposition of the two photometric cells is attributable solely to the amount of contamination in the unfiltered fuel in tubular member 46.

Figure 2:
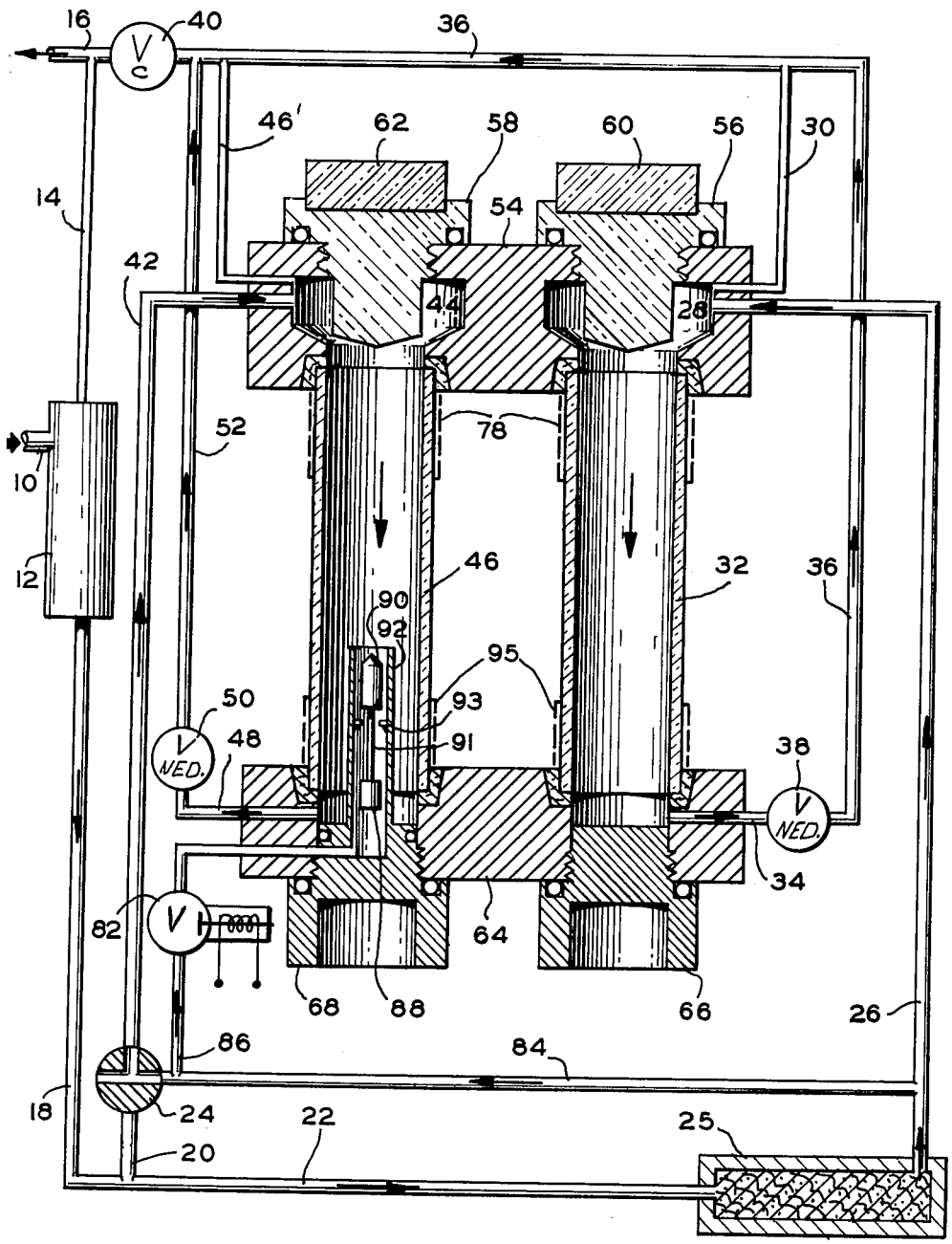
FIGURE 2 is the same apparatus as that shown in FIGURE 1 but showing a different fluid flow which occurs during instrument calibration, this being accompanied by proper setting of the valves which direct the fluid flow as indicated.

When it is desired to standardize or "zero in" the instrument for a respective fuel, the three-way valve 24 is turned from the position shown in FIGURE 1 to the position shown in FIGURE 2 so that all of the incoming fuel which is diverted from the main fuel source through the inlet line 10 is passed through the filter 25, the result being that the fuel in both tubular members 32 and 46 should render identical or balanced energization of the respective photometric cells 60 and 62. Obviously, for this condition, the instrument dial should be adjusted to read zero contamination. The fuel flow after leaving the filter is divided between branch lines 26 and 84.

To calibrate the instrument so that it will provide the preferred reading per unit of contamination is obtained by means of control valve 82 which bypasses a small amount of flow from the line 84 through line 86 where it acts against a piston 88 having an enlarged boss 90 with a reflective surface which is extended beyond shielding member 92 by the piston rod 91 and into the path of the incoming beams of light from the illuminating source. A stop 93 limits movement of the boss 90 upwardly or downwardly. Such light as is reflected by the surface of boss 90 at an angle greater than the critical angle is available to energize the photometric cell 62, and, since such reflection can simulate an amount of contamination of standard size, it is a simple matter to adjust the electric circuit to render whatever dial reading is desired responsively to the reflection from boss 90 which simulates a contamination condition. In this way, the instrument can be calibrated for sensitivity. When the boss 90 is retracted, the shielding member 92 absorbs light beams impinging thereon and therefore does not itself cause reflection. Also a coating 95 is applied at the lower position of the tubular members for the same purpose as the coating 78 at the opposite ends of the tubular members to absorb reflection thereon.

Another advantage to the calibration is that when the valve 82 is operated, failure of the dial to register some degree of "contamination" from the boss 90 will indicate that there is some malfunctioning such as failure of the light source 74, clogging of the lines or the like.

Once the instrument is balanced for a particular fuel and is calibrated, the valves 24 and 82 are operated to return the test apparatus from the condition of FIGURE 2 to that of FIGURE 1 for continuous operation.

Referring next to FIGURE 6, the two photometric cells 60 and 62 are shown connected in parallel with opposite polarities to be in opposition so that the net signal is the difference between their individual signals. Since the resulting signal is weak, it needs to be amplified and be communicated in suitable form to instrumentation devices which will indicate the amount of contamination and further produce, if desired, a continuous record of the amount of contamination. In other words, the signal is rendered intelligible. It has also been found advantageous in many cases to indicate, either by lights or audible signal, or both, the condition of an excess of contamination once it exceeds a predetermined amount. While numerous electrical circuits may be devised for accomplishing the foregoing, one acceptable method is that shown by the arrangement of components in FIGURE 6.

The resulting signal from the photometric cells 60, 62 is in the form of a minute current which is supplied through a limiting resistor 94 and potentiometer 96, capacitor 98 to the base of a first amplifying transistor 100. A chopper 102 in the input circuit modulates the D.C. signal from the photometric cells to permit the use of an A.C. type amplifier.

The transistor 100 and resistors 104, 106, 108 and 110 form the first amplifying stage. Resistor 112 and capacitor 114 form a decoupling network. The second stage is an emitter follower transistor 116 and resistor 118. Its output is coupled through a capacitor 120 to the last stage represented by a transistor 122 and resistors 124 and 126. The collector of this stage is connected through capacitor 128 to the second pole of the chopper which in this case, acts also as a synchronous rectifier. The D.C. output is then supplied through low-pass filter 130, 132 into the metering coil of the meter. The recorder jack 134 permits use of a recording instrument, if required.

The chopper 102 is a single pole, double-throw relay. Its coil is periodically energized by current passing through transistor 136. The frequency is determined by a free-running multivibrator consisting of transistors 138 and 140, resistors 142, 144, 146, 148, 150, 152 and capacitors 154 and 156. A semi-conductor diode 158 protects transistor 136 from inductive voltage surges of the relay coil. Low A.C. voltage from the secondary winding of the transformer 159 is rectified by the rectifier 160 and filtered separately for the amplifier and multivibrator through 162, 164, 166 and 168 respectively.

The locking coil of the meter-relay is connected through the coil of relay 170 to D.C. voltage supplied through secondary winding of transformer 172, semi-conductor diode 174 and capacitor 176. Normally open contacts of the relay 178 supply line voltage to the alarm light 180 and external alarm connection 182, whenever the meter-relay reached predetermined reading and the instrument is in "monitor" position.

The four-position switch 184 (FIGURES 6, 7) serves to supply line voltage to components of the indicating as well as remote pick-up assembly. In the "Off" position, the complete system is de-energized. The next, "Calibrate" position provides voltage for the amplifier, multivibrator and the light bulb 74 in the pick-up assembly. In this position, the de-energized three-way solenoid valve 24 causes both tubular members 32, 46 to be filled with clean filtered liquid. By turning the "Balance" knob 188 (potentiometer 192), the meter needle 194 is brought to zero. By depressing contamination simulator push button 196, the two-way solenoid valve 82 is energized and the piston 88 lifts the boss 90 (contamination simulator) into the path of light beams traversing through the tubular member 46, the meter needle 194 swings to the right and by adjusting the calibrate knob 198 (potentiometer 96), it is brought to the position desired on the meter scale. After this is done, the push button 196 is released and the selector switch 184 is turned to the "Test" position. This energizes the three-way solenoid valve 24, the tubular member 46 is supplied with unfiltered liquid and the degree of contamination will show on the meter scale. The last "Monitor" position of the selector switch 184 with the proper positioning of pointer 202 provides an automatic alarm for a predetermined level of contamination, and continuous operation is effected.

Since the instrument is adapted to monitor fuel purity at any selected stage of fueling or location of fuel transfer operations, it can be used as a warning device against failure of the fuel filter as well as a detecting of the origin of contamination in a complex multiple tank fuel system. Since the sampling procedure provides for a separation of the instrument and the point where the fuel is diverted for analysis, it is also possible to provide remote sampling points in a given installation.

It will be apparent from a consideration of the foregoing description that any transparent liquid may be tested in accordance with the invention to detect and measure any haze forming contaminant such as suspensions of water in oil or suspensions of oil in water.

The only connection between the indicator instruments and the point where the sampling is taken is an electric cable which permits a central test point for widely scattered sampling areas. This is an obvious advantage in that it is possible to locate the recording instruments in any convenient place for operation.

While the electrical components will obviously differ from one application to the next, it is possible to operate the instrument from a 110 volt 60 cycle line with a total power consumption of approximately 74 watts. The illuminating source 74 consists of a conventional 60 watt light bulb and the filter 25 is a "Microweb" membrane with 0.45 micron particle selectivity bonded with a porous supporting paper and elastic gaskets providing an expendable assembly. Changing the filter 25 and periodic cleaning of the photometric tubes 32, 46 can be accomplished easily, without removing the main housing of the pick-up assembly. For best results, the sampling line 10 should have $3/16$ inch to $1/4$ inch inside diameter. Too large tubing might cause settling of dirt particles on their way to the instrument, while too small tubing would present an undue restriction to the flow. The discharge, or return line 16, can be of the same, or preferably larger size, if a long length is involved.

While the invention has been explained in connection with one selected example embodiment, it will be understood that this is only illustrative of the invention and is in no sense restrictive thereof. It is intended that such variations and revisions of the invention as may reasonably be expected on the part of those skilled in the art, and which incorporate the herein disclosed principles, will be included within the scope of the following claims as equivalents of this invention.

I claim:
1. Apparatus for continuously testing transparent liquids comprising, in combination:
   (a) a filter adapted for micron particle selectivity, said filter communicating with the liquid under test to receive samplings thereof,
   (b) a first container means including a transparent tubular portion connected to said filter to receive filtered liquid therefrom, said filtered liquid serving as a reference liquid,
   (c) a second container means including a transparent tubular portion connected with the liquid under test to receive unfiltered samplings thereof,
   (d) a light source means disposed adjacent the first and second transparent containers,
   (e) photometric cells disposed adjacent one end of each of the first and second transparent containers for measuring the intensity of light originating as reflected light from particles of adulterant material contained in said filtered and unfiltered liquid samplings,
   (f) means surrounding the end portions of the first and second transparent containers for shielding said photometric cells from direct and incident beams of said light source thereby limiting the energization of said photometric cells essentially to scattered light produced continuously by adulterants in said liquid,
   (g) said photometric cells connected in parallel with opposite polarities so that their net signal provides a measurement of adulterations in the unfiltered liquids, and
   (h) meter means for receiving the net signal from said photometric cells to continuously provide an indication of adulteration amount.
2. The apparatus in accordance with claim 1 including a housing having a white inner surface to enclose said first and second transparent containers and light source means.

3. An instrument for testing liquids for contamination comprising, in combination:
  (a) a supply line for providing a liquid to be tested for contaminants,
  (b) a filter adapted for micron particle selectivity, said filter connected to said supply line,
  (c) a first container means including a transparent tubular portion connected to said filter to receive filtered liquid,
  (d) a second container means including a transparent tubular portion connected to said supply line to receive unfiltered liquid,
  (e) a housing for said first and second transparent containers, said housing adapted to exclude all exterior light, said housing provided with a highly reflective white interior surface,
  (f) illuminating means disposed within said housing,
  (g) a first photometric cell mounted adjacent one end of said first transparent container, a second photometric cell mounted adjacent one end of said second transparent container, said first and second photometric cells having their photosensitive surfaces exposed to light scattered by contaminants within said liquid as they are struck by the light beams from said illuminating means,
  (h) shielding means surrounding an end portion of each transparent container to protect the photosensitive surfaces of the first and second photometric cells from direct and reflected light beams from said illuminating means,
  (i) said first and second photometric cells connected in parallel with opposite polarities so that their net signal provides a measurement of adulterations in the unfiltered liquid, and
  (j) meter means connected to said net signal for relating an indication of the amount of contamination in the unfiltered liquid.

4. The testing device in accordance with claim 3 including a reflective member disposed for movement within said second transparent container, means for moving said reflective member into the path of beams from said illuminating means to develop reflected light at the interior of said second container in excess of the critical angle necessary to reach said second photometric cell and simulate scattered light from contaminants, and means for calibrating the signal originating from said first and second photometric cells energized by such reflected light to adjust the intelligible value received from said testing device.

References Cited by the Examiner

UNITED STATES PATENTS

| | | |
|---|---|---|
| 2,019,871 | 11/35 | Pettingill et al. |
| 2,406,409 | 8/46 | Sheridan _____ 88—14 |
| 2,437,715 | 3/48 | Thorp et al. _____ 88—14 |
| 2,510,977 | 6/50 | Hobelmann. |
| 2,763,853 | 9/56 | Grant. |
| 2,819,608 | 1/58 | McLaren et al. _____ 88—14 |
| 2,866,378 | 12/58 | Warshaw et al. _____ 88—14 |

JEWELL H. PEDERSEN, *Primary Examiner.*

WILLIAM MISIEK, EMIL G. ANDERSON, *Examiners.*